No. 707,538. Patented Aug. 26, 1902.
J. BAKER.
RIM AND FELLY FOR RUBBER VEHICLE TIRES.
(Application filed Apr. 9, 1902.)

(No Model.) 3 Sheets—Sheet 1.

Witnesses:
E. F. Wilson
John Snowhook

Inventor:
John Baker
By Rudolph M. Foty
Attorney.

THE NORRIS PETERS CO., PHOTO-LITHO., WASHINGTON, D. C.

No. 707,538. Patented Aug. 26, 1902.
J. BAKER.
RIM AND FELLY FOR RUBBER VEHICLE TIRES.
(Application filed Apr. 9, 1902.)
(No Model.) 3 Sheets—Sheet 2.
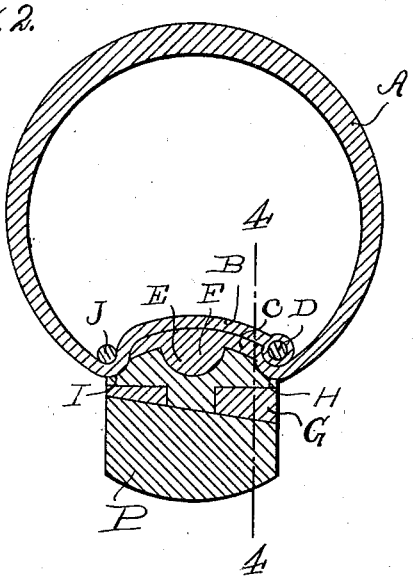
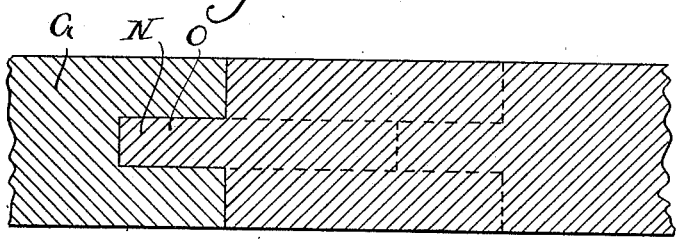
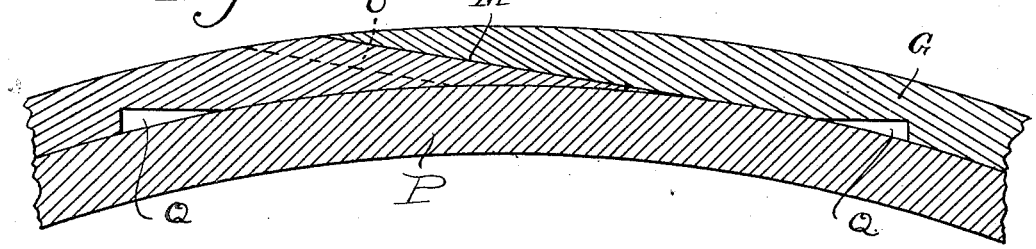
Witnesses. Inventor:
E. F. Wilson John Baker
John Snowhook By Rudolph M. Foy
Attorney.

No. 707,538. Patented Aug. 26, 1902.
J. BAKER.
RIM AND FELLY FOR RUBBER VEHICLE TIRES.
(Application filed Apr. 9, 1902.)
(No Model.) 3 Sheets—Sheet 3.

Witnesses: Inventor.
E. F. Wilson John Baker
John Snowhook By Rudolph Fox
Attorney

UNITED STATES PATENT OFFICE.

JOHN BAKER, OF MEACHAM, ILLINOIS.

RIM AND FELLY FOR RUBBER VEHICLE-TIRES.

SPECIFICATION forming part of Letters Patent No. 707,538, dated August 26, 1902.

Application filed April 9, 1902. Serial No. 102,023. (No model.)

*To all whom it may concern:*

Be it known that I, JOHN BAKER, a citizen of the United States, residing at Meacham, in the county of Dupage and State of Illinois, have invented certain new and useful Improvements in Rims and Fellies for Rubber Vehicle-Tires; and I do hereby declare the following to be a full, clear, and exact description of the invention, such as will enable others skilled in the art to which it appertains to make and use the same.

My invention relates to a novel construction in a rim and felly for rubber vehicle-tires, the object being to provide a rim which can be contracted to be inserted in an endless tire and then expanded to engage and receive the tire and held in such expanded position by the felly.

My invention consists in the features of construction and combinations of parts hereinafter fully described and claimed.

Figure 1:
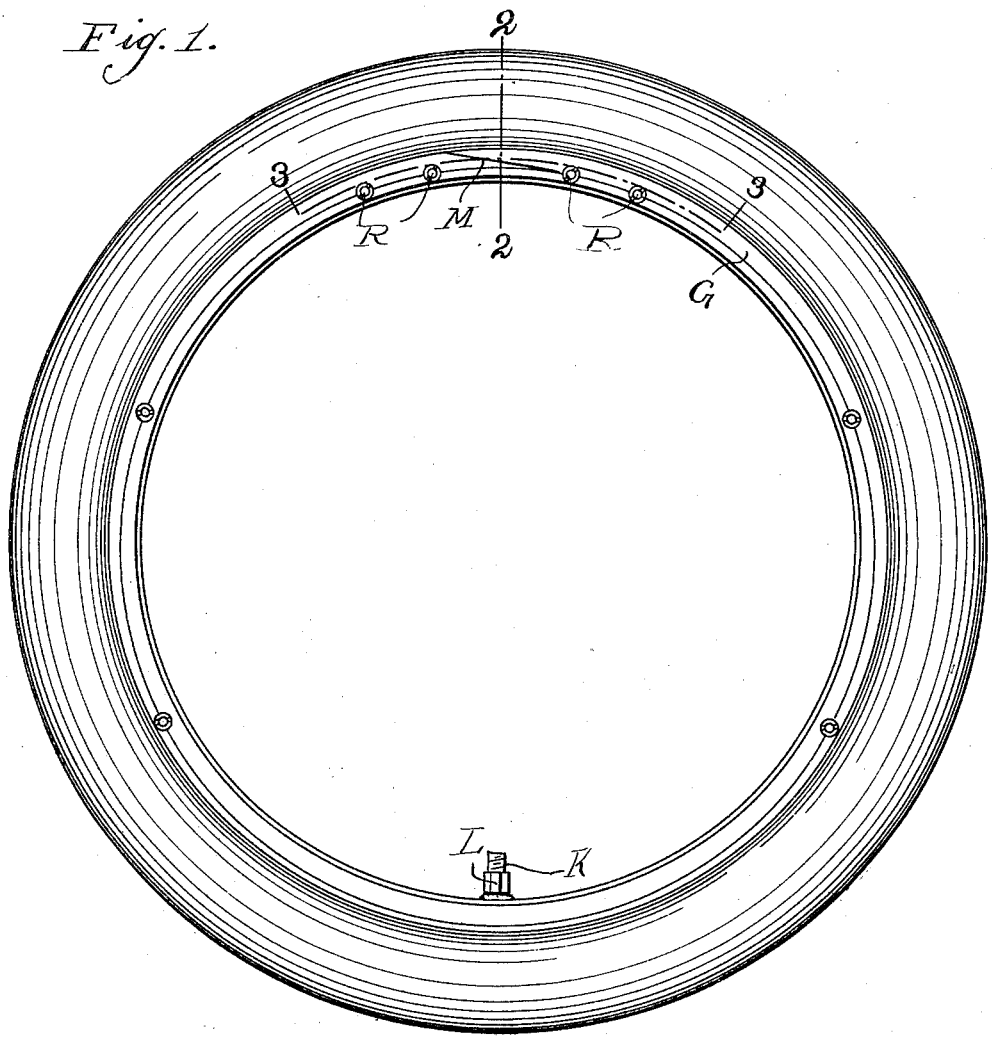
Figure 5:
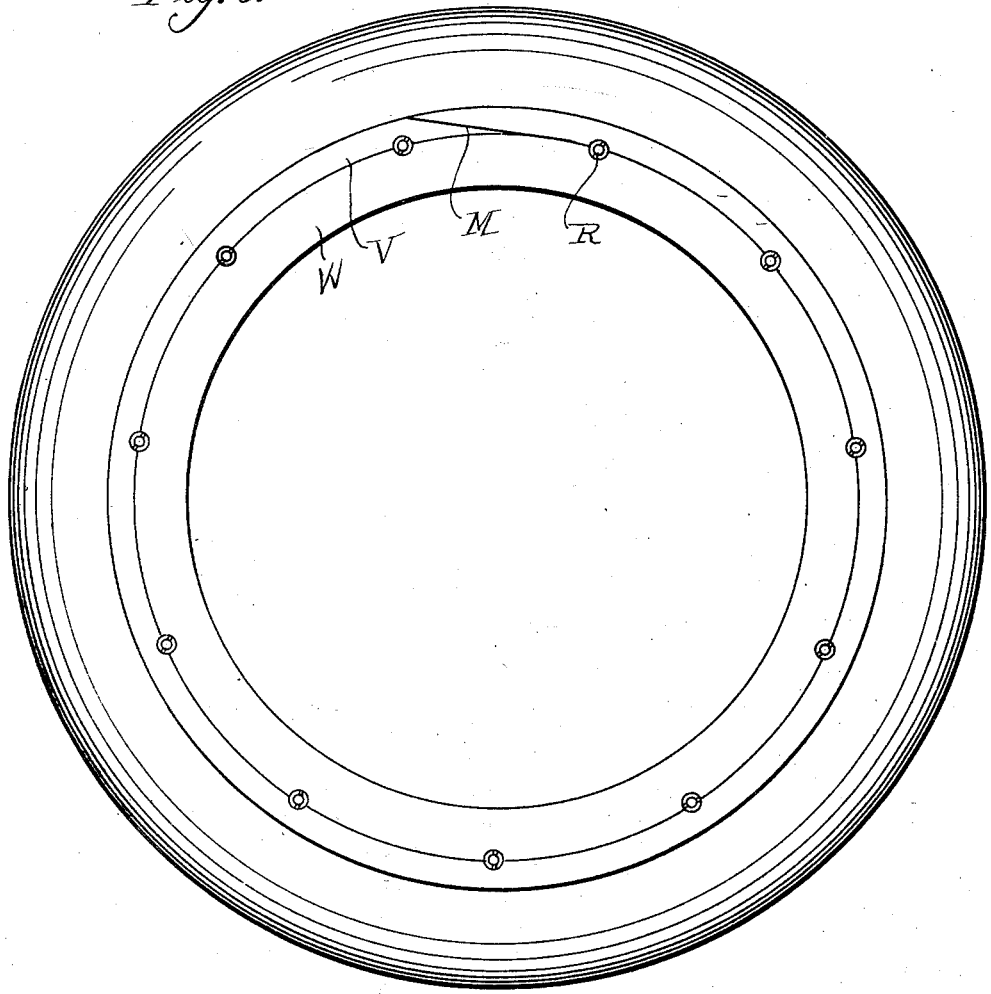
Figure 6:
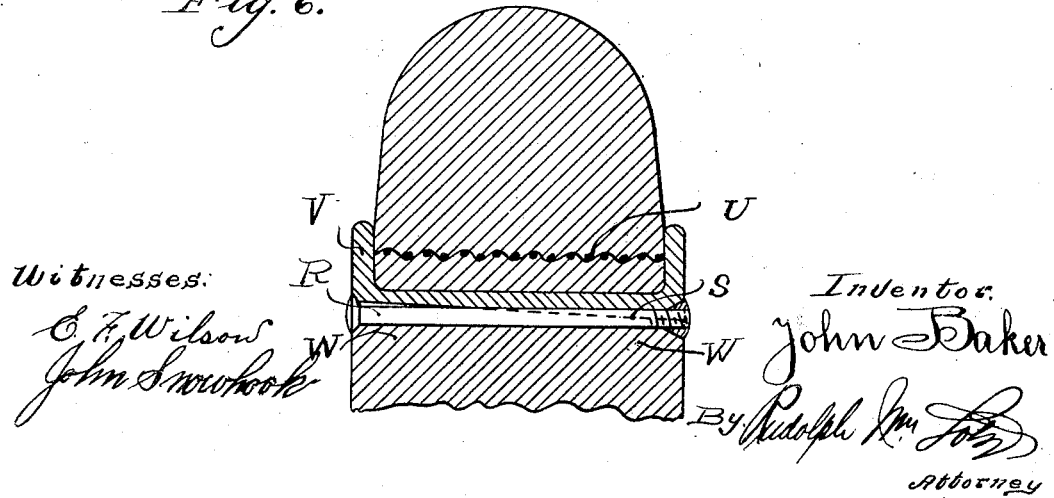

In the accompanying drawings, illustrating my invention, Figure 1 is a side elevation showing a rim and felly constructed in accordance with my invention and a pneumatic tire in place thereon. Fig. 2 is a transverse section of same on the line 2 2 of Fig. 1. Fig. 3 is a detail section, on an enlarged scale, on the arc 3 3 of Fig. 1. Fig. 4 is a detail section, on an enlarged scale, on the line 4 4 of Fig. 2. Fig. 5 is a side elevation showing my invention as applied to solid rubber tires. Fig. 6 is a section, on an enlarged scale, on the line 6 6 of Fig. 5.

My present invention is designed particularly to be used in connection with the pneumatic tire for which Letters Patent No. 653,497 were granted to me on July 10, 1900, having found that my said tire is very difficult to manipulate when made for heavy loads. The said tire consists of an annular band A, having edge portions B and C, which form flaps which overlap each other on the rim, thus forming an annular tube which is adapted to be inflated. The edge B has an annular band D, of heavy wire, intermolded therein, and the flap C is provided with an annular enlargement or shoulder E on its outer face, which is adapted to enter an annular groove F in the rim G. The said rim G is double convex on its outer face, being provided with said groove at its middle portion and with annular grooves H and I on its sides, into which portions of said tire are adapted to be compressed. The said annular band D is of such diameter relatively to the diameter of the rim on the grooves H and I as to permit the insertion of part of the flap C between it and said groove, said portion being compressed into said groove by said band when the tire is inflated. Said tube is adapted to contain a free annular band J, the latter being inserted in same when said tube is open by turning the edge C thereof back and over the rim G and passing same through said band J. Said band J is adapted to compress part of the flap C into the groove I, its diameter being the same relatively to said groove I as the band D is to the groove H. A tube K, containing a check-valve, is secured to said flap B and is adapted to pass through an opening in the flap C and its annular shoulder E and through an opening in the rim. The free end of the tube K is screw-threaded to receive a nut L, by means of which it is drawn down to hold the flaps B and C firmly down upon the rim at this point.

To mount my tire on the rim, the flap C is first drawn over said rim until said flap B is practically in place on the same, said band D preventing said flap B from passing completely over said rim. Said flap C is then inserted through said band J and then turned back and inserted through said band D underneath the flap B until the shoulder E is in place in said groove F in the rim, the part of the flap B adjacent the valve K being then moved outwardly to permit the end of said valve to be inserted through the opening in flap C. The tread portion M of the band A is then drawn outwardly, thereby moving the bands D and J sidewise until they press upon the flaps C and B, respectively. They may then be further pressed by the fingers until they compress the rubber into the grooves H and I and are in proper position. In this manner the tube formed is rendered air-tight, and by then inflating it the tire is complete. After inflation it will be obvious that the tendency of the tread portion to move outwardly will exert a side pressure upon the bands D and J, thus forcing same more firmly into the grooves H and I and securely holding them against displacement. This method of mounting the tire is quite satisfactory when the same is made light and very flexible; but when made to bear heavy strains it cannot be maintained sufficiently flexible for convenient handling, and I have found it almost impossible to successfully manipulate it without excessive loss of time. Hence I have devised a rim and felly by means of which I readily overcome the difficulty, my present invention being also applicable to other tires besides my own. To this end I provide a rim G, which is split at the point M, preferably on a bevel, the joint being a dovetail—that is, one end of the rim being provided with a groove N and the other end with a tongue O, adapted to fit said groove. The said rim G is beveled on its inner face and is adapted to be mounted on a felly P, having a beveled outer face, said rim and felly being both beveled to a greater degree at a point diametrically opposite the passage of the tube K therethrough, it being obvious that in mounting the rim on said felly when the tire is in place on said rim said tube must be first inserted through an opening in the felly, and the rim must turn upon this point as a fulcrum in being completely mounted. By the use of the split rim, which can obviously be contracted in size, the tire can be set with its parts in practically correct relative position and the rim then inserted and expanded, so that the tire becomes properly mounted thereon. As the tire offers great resistance to the expansion of the rim to a sufficient extent to enable it to be mounted on the felly, I have provided two recesses Q in the inner face of the rim, one on each side of the joint and adjacent that one of the side edges having the smallest diameter, said recesses being adapted to receive the ends of a jack-screw or similar device by means of which said rim can be forcibly expanded. Said rim, with the tire thereon, is then placed in position on the felly as far as the jack-screw will permit, and the latter is then removed. The rim is then forced on the felly and is completely expanded by this action and is secured in position by means of bolts R, passing through openings S, bored partially through both rim and felly, the heads and nuts of said bolts being preferably conical and countersunk.

In Figs. 5 and 6 I have shown my invention applied to endless solid rubber vehicle-tires, the tire T being preferably provided with an intermolded non-expansible band U of stiffening material, such as heavy wire-cloth. The channel-rim V is placed within said tire and expanded, so that said tire is received within the flanges of the rim. The said rim is provided with a beveled inner face and the felly W with a beveled outer face, the beveling being, however, equal all around, for the reason that there is no air-valve to contend with. The said rim is then secured on the felly by means of the bolts R.

I claim as my invention—

1. The combination with a tire having in part a smaller diameter than the rim to receive the same, of a laterally-split rim provided on both its side edges with devices adapted to receive and retain a rubber tire in place thereon and provided with a beveled inner face, said rim being adapted to be contracted to enter the tire and expanded to receive the latter, and a felly having a beveled outer face adapted to receive and expand said rim and hold same in its expanded position.

2. The combination with a pneumatic tire having an inflating-valve projecting therefrom, of a rim having an opening to receive said valve, said rim being split at a point diametrically opposite said opening and adapted to be contracted to enter the tire and expanded to receive and hold the latter, and a felly having an opening to receive said valve, said rim and felly being partially beveled on their contact-surfaces opposite said openings.

3. The combination with a tire having in part a smaller diameter than the rim to receive the same, of a laterally-split rim provided on both its side edges with devices adapted to receive and retain a rubber tire in place thereon and provided with a beveled inner face, said rim being adapted to be contracted to enter the tire and expanded to receive the latter, openings in the inner face of said rim adjacent one edge thereof, adapted to receive expanding devices, and a felly having a beveled periphery adapted to receive said rim, said rim being adapted to be partially inserted into position on said felly while the expanding devices are held in place thereon and subsequently, after removal of said expanding devices, forced into proper position on said felly and completely expanded by the latter.

4. The combination with an endless tire, of a split rim adapted to be contracted to enter said tire and expanded to receive and hold the latter, the joint in said rim being on a bevel and having a tongue and groove interfitting with each other to prevent relative lateral movement of those parts of said rim on each side of said joint, and a felly adapted to receive said rim and hold same in its expanded position.

In testimony whereof I affix my signature in presence of two witnesses.

JOHN BAKER.

Witnesses:
RUDOLPH WM. LOTZ,
JOHN SNOWHOOK.